Patented Apr. 6, 1943

2,316,142

UNITED STATES PATENT OFFICE 2,316,142

DIETHYL ACETATE OF CORTICOSTERONE

George F. Cartland and Marvin H. Kuizenga, Kalamazoo, Mich., assignors to The Upjohn Company, Kalamazoo, Mich.

No Drawing. Application August 8, 1941, Serial No. 406,004

12 Claims. (Cl. 260—397.4)

This invention relates to improvements in diethyl acetate of corticosterone.

This invention relates to cortical hormone substances of increased activity and in particular to such substances capable of alleviating conditions resulting from hypoadrenalism such as asthenia during and following severe infections, severe intestinal intoxication, surgical or traumatic shock and other conditions where there are disturbances in the salt and water balance or in the carbohydrate or protein metabolism such as those that occur in hypoadrenalism. We have found that diethyl acetate of corticosterone or of the composite steroid fraction of adrenal glands, namely the composite cortical hormone fraction obtained from adrenal glands, have very materially greater biological activity than the corticosterone or the steroid fraction from adrenal glands respectively.

The objects of this invention are:

First, to provide new and improved agents of the class described.

Second, to provide such agents which have greater activity than the corticosterone or the steroid fraction from adrenal glands and greater activity than known esters of corticosterone or the aforesaid steroid fraction.

Third, to provide such agents which can be produced relatively inexpensively and easily.

Fourth, to provide new and improved methods of producing such agents.

Other objects and advantages pertaining to details and economies will appear from the description to follow.

The new agent, diethyl acetate of corticosterone, has a formula $C_{27}H_{40}O_5$. It consists of long feathery crystals having a melting point of 179–180° C.

This product may be produced as follows: 75 mg. of corticosterone are dissolved in .75 cc. of absolute pyridine. .3 cc. of diethyl acetyl chloride are added. The mixture is kept at room temperature over night. The reaction mixture is then taken up in ether and washed successively with acid, 2% $K_2CO_3$, and finally with water. The product is crystallized from acetone. The crystals of the diethyl acetate of corticosterone thus produced have a melting point of 179–180° C.

In place of the diethyl acetyl chloride, any diethyl acetyl compound can be used, which, when reacted with alcohols yields the diethyl acetic acid ester such as the diethyl acetylhalides, the acid or its anhydride.

The new product may be administered by injection as an oil solution.

We have found by biological test that the new product, the diethyl acetate of corticosterone, has a biological activity approximately four times that of the corticosterone. It has a biological activity about twice as great as that of any other known ester of corticosterone.

It is possible to administer the hormone thus more efficiently and to get equivalent hormone effects with greatly decreased dosage.

The increase in activity obtained by preparing the diethyl acetic acid ester is not limited to corticosterone. We have found that if the entire steroid fraction obtained from the adrenal cortex is esterified with diethyl acetyl chloride or other diethyl acetyl esterifying compounds, there is a very material potentiating effect. This steroid fraction consists of corticosterone as one of the most important constituents together with the other steroids of the composite cortical hormone fraction obtained from the adrenal glands, some of which have been identified and others of which still remain to be identified. The esterification of the steroid fraction may be carried out as follows:

The composite steroid fraction from 24 kilos of adrenal glands is dissolved in 1 cc. of absolute pyridine. .3 cc. of diethyl acetyl chloride are added. The mixture is kept at room temperature over night. The reaction mixture is then taken up in either and washed with dilute HCl, 1% $K_2CO_3$, and finally with water. The ether is then dried with $MgSO_4$ removed by distillation and the residue dissolved in oil.

As in the case of corticosterone, in place of the diethyl acetyl chloride, any diethyl acetyl compound can be used which when reacted with alcohols yields the diethyl acetic acid ester such as the other diethyl acetyl halides, the acid, or its anhydride.

The product obtained from this esterification of the steroid fraction has been shown by biological test to have a biological activity of 60% more than the composite steroid fraction of the adrenal glands before treatment.

This enhancement of the cortical hormone activity is highly desirable as in the case of the diethyl acetate of corticosterone.

The terms and expressions which have been herein employed are used as terms of description and not of limitation. There is no intention in the use of such terms and expressions of excluding any equivalents of the features shown and described. It is recognized that various modifications are possible within the scope of the invention claimed.

Having thus described our invention, what we claim as new and desire to secure by Letters Patent is:

1. The method of producing the diethyl acetate of corticosterone comprising dissolving corticosterone in pyridine and adding diethyl acetyl chloride and permitting the corticosterone and the diethyl acetyl chloride to react, taking up the mixture in ether and washing it successively in acid potassium carbonate and water.

2. The method of producing the diethyl acetate of corticosterone comprising dissolving corticosterone in pyridine and adding diethyl acetyl chloride and permitting the corticosterone and the diethyl acetyl chloride to react.

3. The method of making diethyl acetate corticosterone comprising adding to a solution of corticosterone in pyridine a diethyl acetyl esterifying compound and permitting it to react with the corticosterone and then separating the corticosterone diethyl acetate from the reaction mixture.

4. A product of the class described having the property of acting on disturbed salt and water ratios, and protein and carbohydrate metabolism and controlling muscular fatigue, asthenia and crises of adrenal cortical deficiencies comprising the diethyl acetate of corticosterone.

5. Diethyl acetate of corticosterone having the formula $C_{27}H_{40}O_5$, and a melting point of 179–180° C.

6. The diethyl acetate of corticosterone.

7. The method of producing the diethyl acetic acid ester of the composite cortical hormone fraction obtained from adrenal glands, comprising dissolving said fraction in pyridine and adding diethyl acetyl chloride, and permitting the fraction and the diethyl acetyl chloride to react, taking up the mixture in ether, and washing successively in acid, potassium carbonate, and water.

8. The method of producing the diethyl acetic acid ester of the composite cortical hormone fraction obtained from adrenal glands, comprising dissolving said fraction in pyridine and adding a diethyl acetyl esterifying compound, and permitting the fraction and the diethyl acetyl esterifying compound to react.

9. The method of producing the diethyl acetic acid ester of the composite cortical hormone fraction obtained from adrenal glands, comprising dissolving said fraction in pyridine and adding diethyl acetyl chloride, and permitting the fraction and the diethyl acetyl chloride to react.

10. A product of the class described having the property of acting on disturbed salt and water ratios and protein and carbohydrate metabolism, and controlling muscular fatigue, asthenia and crises of adrenal cortical deficiencies comprising the diethyl acetic acid ester of the composite cortical hormone fraction obtained from adrenal glands.

11. The diethyl acetic acid ester of the composite cortical hormone fraction obtained from adrenal glands.

12. The diethyl acetic acid esters of adrenal cortical hormones.

GEORGE F. CARTLAND.
MARVIN H. KUIZENGA.